United States Patent [19]

Collins et al.

[11] 4,063,308
[45] Dec. 13, 1977

[54] AUTOMATIC CLOCK TUNING AND MEASURING SYSTEM FOR LSI COMPUTERS

[75] Inventors: Clive A. Collins, Wappingers Falls; Vincent F. Sollitto, Rhinecliff, both of N.Y.

[73] Assignee: International Business Machines Corporation, Armonk, N.Y.

[21] Appl. No.: 591,194

[22] Filed: June 27, 1975

[51] Int. Cl.² .............................................. G06F 1/04
[52] U.S. Cl. ................................................... 364/200
[58] Field of Search ..................................... 340/172.5

[56] References Cited

U.S. PATENT DOCUMENTS

| 3,343,136 | 9/1967 | Nyberg ............................. 340/172.5 |
| 3,573,743 | 4/1971 | Hadd et al. ....................... 340/172.5 |

Primary Examiner—Raulfe B. Zache
Attorney, Agent, or Firm—Harold H. Sweeney, Jr.

[57] ABSTRACT

An automatic clock tuning and measuring system is provided for data processing system wherein fixed frequency clock pulses are selectively delayed and distributed in accordance with a clock path and delay selection made by a computing means. A reference generator is connected to the fixed frequency clock pulses source for delaying the clock pulses a reference amount which is selected by the computing means in accordance with the predetermined delay associated with the selected path. An automatic time measuring means is connected to both the reference generator and the clock distribution means for providing an output indicative of the time comparison condition of a delayed clock pulse and the reference delayed clock pulse. The output time comparison or non-comparison of the delayed clock pulse and the reference delayed clock pulse is utilized through the computer means to adjust the amount of delay introduced by the automatic delay means or is utilized to adjust the delay increment established in the reference generator to provide the clock tuning and measuring respectively.

13 Claims, 10 Drawing Figures

T²L NAND LSI CIRCUIT

GROSS ADJUST NETWORK 58

FIG. 11 TIME DETECTOR UNIT LATCH

FIG. 11a TIMING DIAGRAM

FIG.12

AUTOMATIC CLOCK TUNING AND MEASURING SYSTEM FOR LSI COMPUTERS

BACKGROUND OF THE INVENTION

Field of the Invention

This invention relates to a clock tuning and measuring system and, more particularly, to a clock tuning system in which the delay is automatically adjusted to provide the arrival of the clock pulse at an automatically selected clock path at the right time and to provide an arrangement whereby the arrival time of a clock pulse on a pre-selected path can be automatically measured.

In data processing systems the timing of events is extremely critical. The clock pulses which trigger these events must arrive at the prescribed time. It is known that circuits and especially transmission lines have inherent delay and accordingly, a clock pulse transmitted a long distance over such lines must be retimed. This has been done heretofore in data processing equipment by providing adjustable delays in the transmission lines such that the clock signal can be retimed. The retiming is accomplished by attaching an oscilloscope at the node where the clock pulse is to be retimed. The actual time of arrival of the clock pulse is compared with the required time of arrival and the delay adjusted manually accordingly. It will be appreciated that a number of these tuning points are required in data processing equipment. Accordingly, a big time and cost factor in the manufacture of data processing systems is the tuning of the system both when it leaves the factory as well as when it is installed in the customer's office. Along with the miniaturization of data processing equipment, it has become more and more difficult to scope the nodes where the timing is to be measured. This type of manual tuning has become virtually impossible with the advent of large scale integration, and particularly with encapsulated type circuits.

SUMMARY OF THE INVENTION

Accordingly, it is the main object of the present invention to provide an automatic clock turning system for data processing equipment.

It is another object of the present invention to provide an automatic clock tuning system in which the insertion or removal of delay is programmably selectable.

It is a further object of the present invention to provide an automatic clock tuning system for data processing systems which considerably reduces the turning time and cost.

It is another object of the present invention to provide an automatic clock measuring system for data processing equipment wherein the time of arrival of a timing pulse can be automatically measured.

It is a further object of the present invention to provide an automatic clock tuning and measuring system for data processing systems in which the control of the clock tuning and measuring system can be remotely controlled.

The invention provides an automatic clock tuning and measuring system for data processing systems wherein fixed frequency clock pulses are selectively delayed and distributed in accordance with a programmable mode by a computing means. A reference generator is provided connected to the source of fixed frequency clock pulses for delaying one of the clock pulses a reference amount selected by the computing means in accordance with the predetermined delay associated with the selected path to which the clock distribution means is set. An automatic time measuring means is connected to the reference generator and the clock distribution means for providing an output indicative of the comparison condition of successive delayed clock pulses and a reference delayed clock pulse to thereby adjust the delay of the programmable delay means through the computing means until a comparison of one of the delayed clock pulses and the reference delayed clock pulse is obtained thereby providing tuned timing pulses automatically to the selected paths.

The invention may be operated in second form wherein the time of arrival of the clock pulses at the node on the pre-selected path is measured by utilizing the output of the time measuring means to adjust the reference generator time delay until the time measuring means indicates a comparison between the delayed clock pulse on the pre-selected path and the time delayed pulse produced by the reference generator. The time delay produced by the reference generator is equivalent to the time delay of the clock pulse at the node being monitored when a comparison is indicated by the time measuring means.

DESCRIPTION OF THE PREFERRED EMBODIMENT

Figure 1:
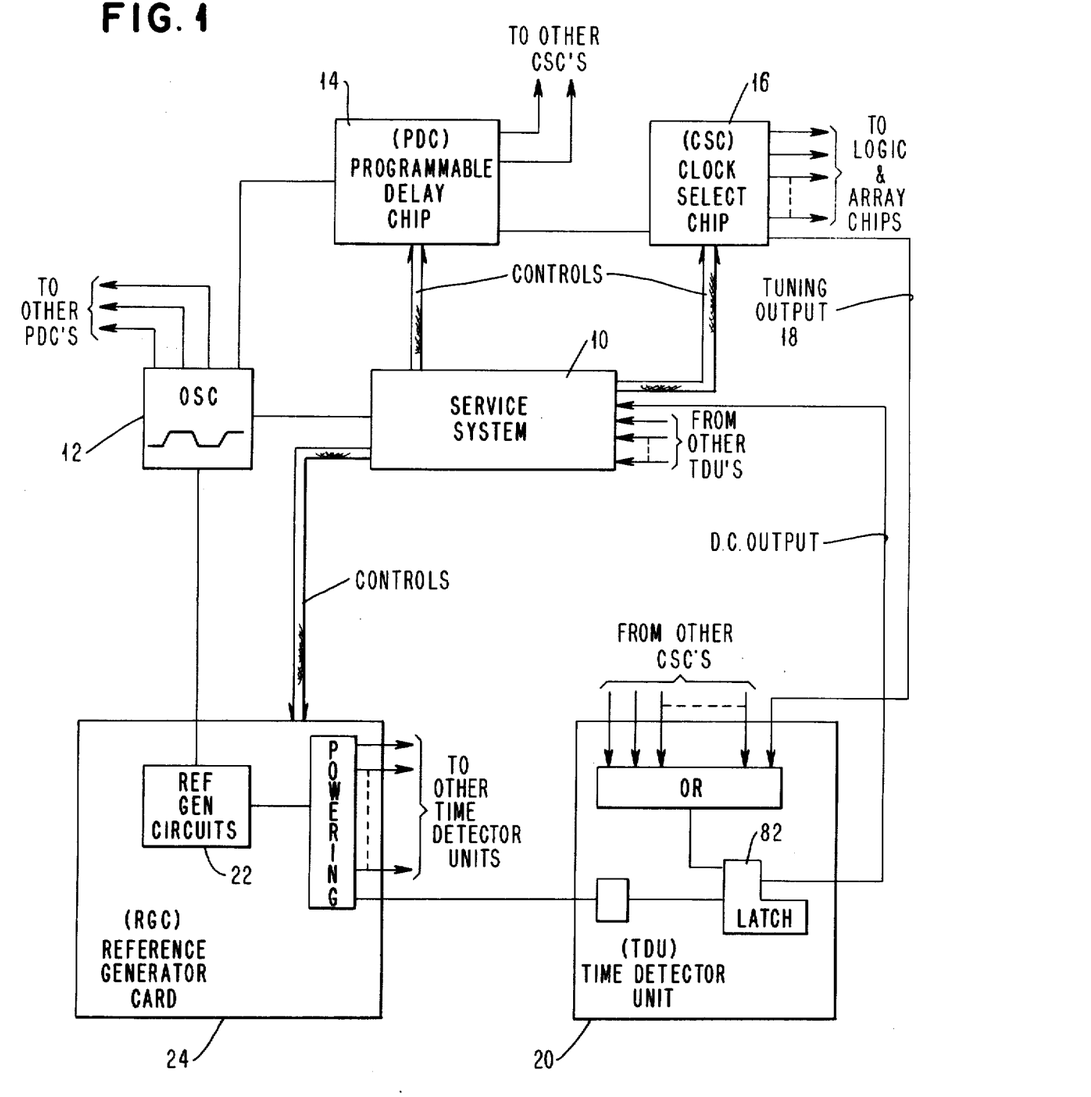
FIG. 1 is a block diagram of the clock measuring and tuning system of the present invention.

Referring to FIG. 1, there is shown a schematic arrangement in block diagram form for providing automatic tuning of the clock signals at a particular node in a particular path within a data processing system. The tuning is done by automatically adjusting the time of arrival of the clock at the selected node so as to correspond with a pre-determined timing that the clock should have to arrive at this point to initiate some desired function. The time of arrival of a clock pulse at a particular node can be controlled by selecting the amount of delay inserted into the particular clock line. The system can also be used to measure the actual time of arrival of the clock pulse at a particular node within the system to be timed. The service or processing system 10 provides the necessary controls and data to the rest of the system to control the amount of delay applied to the clock pulse and to control the distribution of that clock pulse to the required path or paths. The service system 10 also serves to control the time measurement of the clock pulse arriving at the desired node with respect to the desired time of arrival so that the computer or service system 10 can order the required adjustment to correct the timing of the clock pulse. The system has the further operational capability in that the time measuring unit can be simply utilized to measure the time of arrival of a clock at any particular node.

The service system 10 includes a general purpose computer or a small special purpose computer such as the IBM System 7 which is described in the IBM System/7 System Summary Manual GA-34-0002-5 available from the IBM Corp., 4350 East West Highway, Bethesada, MD. 20234 or from the nearest IBM branch office serving your locality. IBM System/7 is a high-speed, real time computing system designed for applications requiring sensorbased or data processing input-/output operations. In the process control application, the System/7 computer continuously monitors the external operation. Generally, it acquires the data either analog or digital from an industrial process and calculates the control corrections to insure the proper function of the process. It applies appropriate control signals to the controlling elements in the process. The computing unit of the present invention has to perform a similar function, for example, digital data representing the comparison or non-comparison of the actual clock being monitored with the reference clock generated is supplied to the computer which essentially steps the delay control data which causes the introduction of a further delay. Thus the tuning and measuring of the clock timing of the system can be controlled by digital data from the service system. The service system 10 initiates an oscillator 12 which provides the timed clock pulses of a pre-determined frequency. The oscillator 12 can be of any suitable design but is preferably designed on a circuit card and located within the system to be tuned. An output from the oscillator 12 is connected to a programmable delay chip 14. This unit is under the control of the service system 10 and selects the delay which the service system orders. This delay is applied to the clock pulse from the oscillator 12. This delayed clock pulse is then connected from the programmable delay chip 14 to the clock selection chip 16 where the distribution of the clock to one or more outputs is ordered under control of the service system 10. The output clock signal of the clock selection chip 16 goes to the various logic and array chips within the systemm being tuned. This chip 16 also has a turning output 18 to which the clock pulses for respective paths are respectively connected. These clock pulses on the tuning output line 18 from the clock selection chip 16 are connected into the time detector unit 20. Within the time detector unit 20 the selected clock from the clock selection chip 16 is compared to a reference time generated by the reference generator circuit 22 on reference generator card 24. The reference time generator produces a pulse with the correct timing for the clock pulse of the particular path which is being monitored by means of which it is determined whether the clock is correctly timed or not. The results of the time detector unit are connected to the service system 10 which responds by adjusting the delay introduced by the programmable delay chip 14 to thereby change the timing of the monitored clock pulse to bring it to the time which corresponds to the generated reference time. It should be appreciated, that the monitored clock pulse can be compared in the time detector unit 20 to a reference and the service system 10 can continually change the reference until the reference matches the timing of the monitored clock pulse, thereby providing measurement of the actual time of arrival of the clock pulse at the node in the selected path being monitored. The inputs and outputs of the service system 10 are in digital form and, thus, the service system can be located remotely from the system or systems to be tuned. As may be seen from FIG. 1, the programmable delay chip 14 has a number of connections to other clock selection chips all of which are under the control of the service system. The limiting factor, of course, is the fanout capability of the circuitry used to mechanize the particular chips. A large system to be tuned would require a number of tuning and measuring systems to provide the tuning of clock pulses at the thousands of lines which must be tuned. All of these can be serviced by the same service system. Since the service system inputs and outputs are in digital form, the service system can be remotely located and the digital control information transmitted, for example, over telephone lines. The service system 10 may be of sufficient capacity to handle the tuning and measuring of clocks in a number of data processing systems at the same time.

Figure 2:
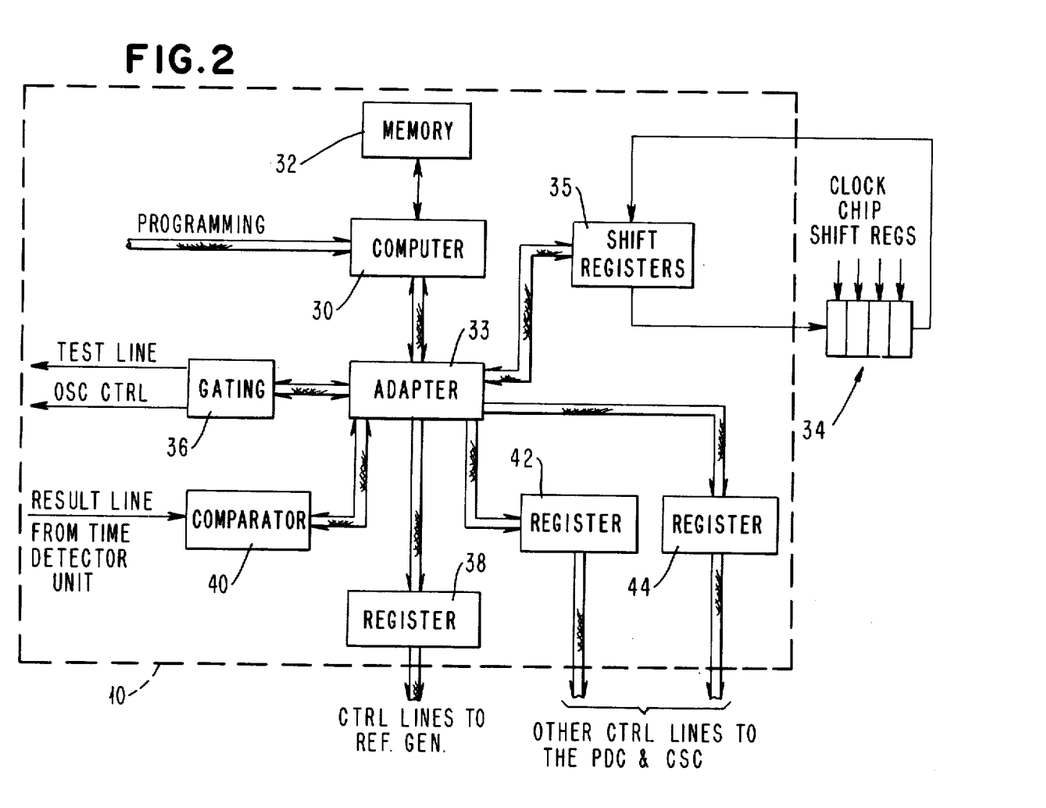
FIG. 2 is a more detailed block diagram of the service or processing system block shown in FIG. 1.

Referring to FIG. 2 there is shown a schematic block diagram of the service system 10 showing the necessary input/output controls for controlling the tuning and measurinng system. The computer 30 utilized in the service system 10 must at least incorporate some data storage and retrieval facility such as memory 32. The programming capability of the service system 10 can be either hardware or softwave controlled. The computer 30 outputs are applied to a well known adapter unit 33. The adapter serves to switch the various signals to the appropriate unit where they are buffered or gated for subsequent transmittal and control. The specific interfaces between the system being tuned and the service system 10 must be able to load the shift register control stores 34 on the clock chips. This is accomplished by loading, by the service system, through interconnected rings of shift registers 34 on the chips. The system oscillator 12 is gated through gating unit 36 by one of the controls from the service system 10. Similarly, the test line for the reference generator is gated by gate 36. The reference generator 24 delay selection control lines are driven through a register 38. The result received from the time detector unit 20 is interpreted by the service system 10 so that it can be triggered to increment a delay in the programmable delay chip 14 or store it's present value. This is accomplished by a comparator 40 which increments the PDC (Programmable Delay Chip) 14 for each "zero" received from the time detector unit 20 and initiates a store when a "one" indicating a comparison between the clock pulse arrival time at the node being monitored and the reference generator output is obtained. The other control lines to the PDC 14 and the CSC 16 are driven through registers 42 and 44, respectively.

Figure 3:
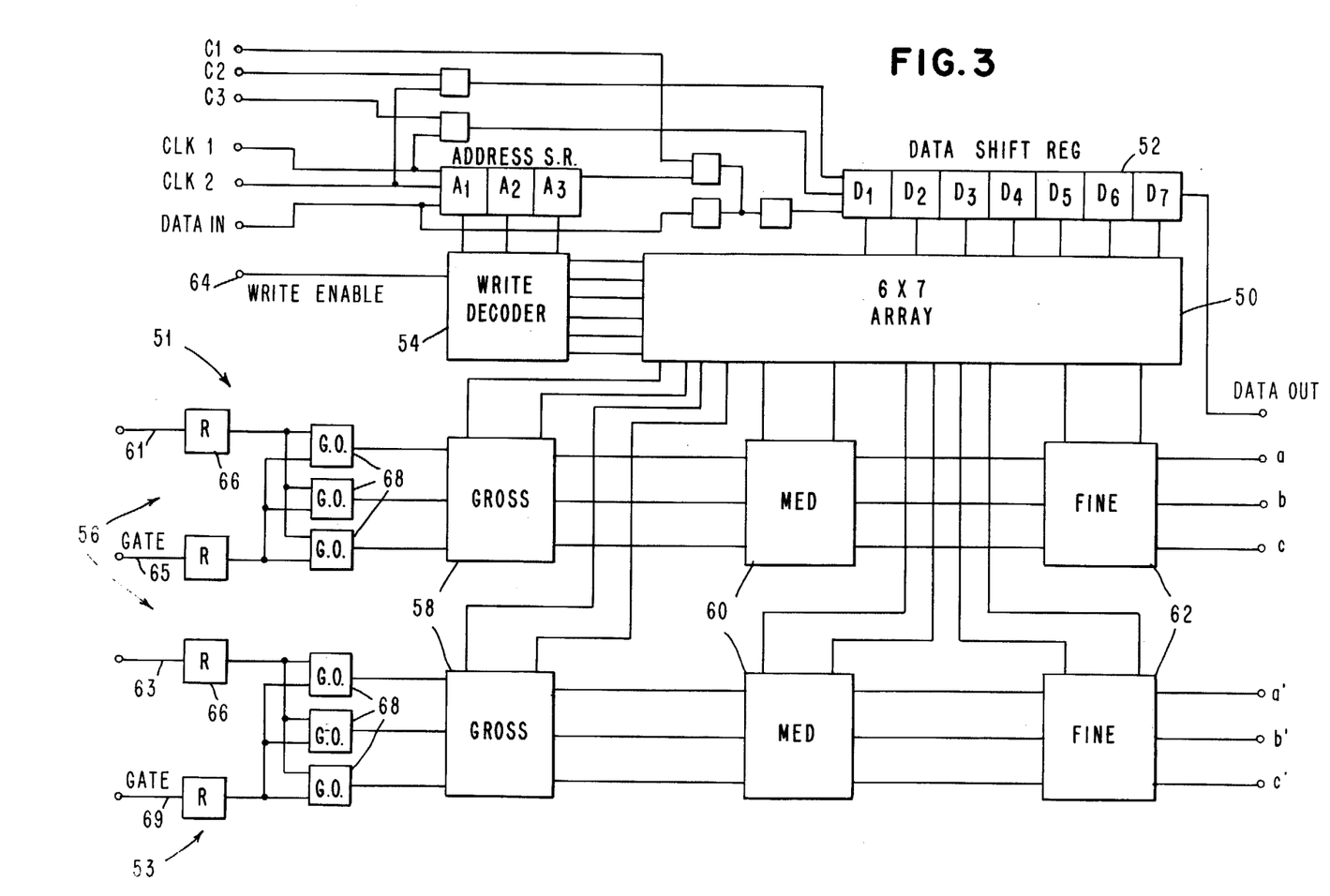
FIG. 3 is a block diagram showing the programmable delay chip of FIG. 1 in more detail.

Referring to FIG. 3 there is shown a schematic block diagram of the programmable delay chip 14 (PDC) of the clock tuning system. The clock distribution utilized in this arrangement is designed to provide the clocks in pairs aa', bb'and cc' for logic use. Actually, the programmable delay chip 14 (PDC) is a variable length clock path whose delay is a function of the circuit technology and of the bit pattern stored in a 6 × 7 array 50. The array 50 is loaded through a 10 bit shift register 52. The clock path is divided into two sections 51 and 53. Each section has one input and three outputs; and each output has independent delays controlled by the bit patterns in the array 50. The PDC 14 is divided into two parts; the first being a write portion which consists of a 10 bit shift register 52, a write decoder 54 and a 6 × 7 array of memory cells. The second part is the read portion which consists of an input network 56, and a gross, a medium and a fine delay adjustment 58, 60 and 62. It is the interrelationship of the two parts which is used to adjust the delay. The array 50 is used to hold the bit patterns which in turn condition the paths through the first and second sections 51 and 53, respectively so as to vary the delay in each of the three delay adjustments gross, medium and fine.

In operation, a complete word from the shift register 35 in the service system 10 is shifted into the shift register 52 associated with the PDC 14. In a data word, the first three bits are the address bits and the last seven bits are the data. The write enable line 64 is brought positive which allows the last seven bits in the shift register 52 to be written into the array 50. This is repeated 5 more times and the complete array 50 is thereby written. At this time, the write operation is completed and the delay of sections 51 and 53 is now a function of the array bit pattern. In the read portion of the PDC 14, the input network 56 obtains the clock inputs $d$ and $d'$ from the oscillator 12 by use of receivers 66. Also, the clock inputs $d$, $d'$ can be gated-off by the gate inputs 65 and 69. The input network 56 also contains gated oscillators 68 to prevent partial pulses from propagating through the system when the clock inputs $d$, $d'$ are gated on and off.

Figure 4:
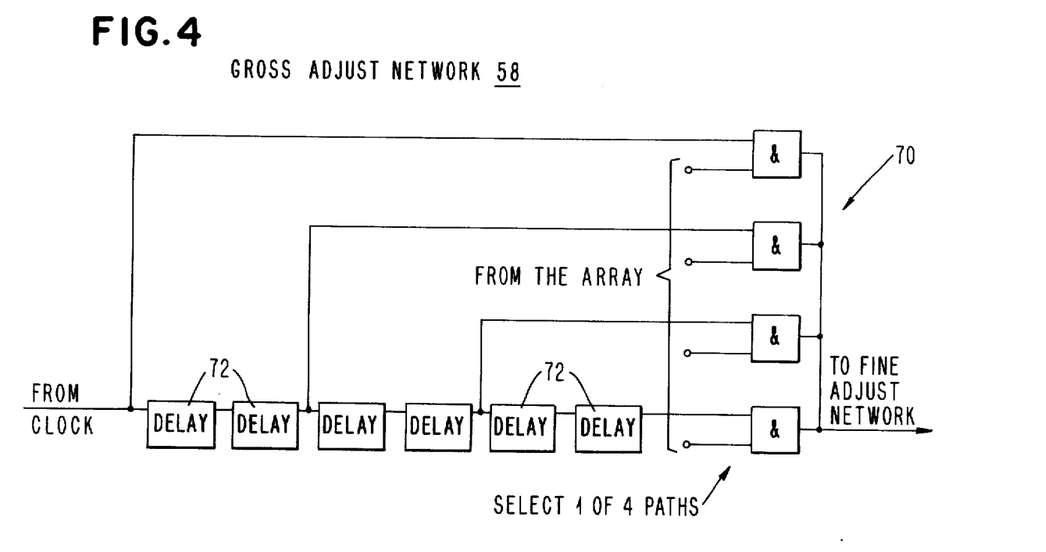
FIG. 4 is a further block diagram showing the gross delay network of FIG. 3 in further detail.

Referring to FIG. 4 there is shown the gross adjust network 58 which provides four steps of delay, two circuit delays per step. The first two bits of the word stored in the shift register 52 (FIG. 3) are fed to a 2 to 4 decoder 54 which can increment the delay in steps of two circuits. The medium adjust provides an increment of approximately one circuit delay and is determined by the state of the third bit in the array. The fine adjust will provide a small increment of delay. This is based on the delay variation of a circuit with a switching vs. non-switching load. The fine adjust 62 has provisions for adjusting the number of switching and non-switching loads from 1 to 10 in steps of 1 load per increment as selected by the last four bits in the shift register 52. FIG. 4 shows an arrangement for the gross adjust network. The six units of delay 72 are shown between the input and the output of the gross adjust network 58. The gating arrangement 70 consists of four AND circuits which are selectively switched by the application of a control input from the decoder via the array. The selection determines the bypass path by means of which two element steps of delay are selected. Thus, one of four paths can be selected. It will be appreciated, that with the use of a decoder the selection could be extended to $n$ paths. The selection at the AND circuits 70 is made in accordance with the outputs from the 6 × 7 array. The medium delay (not shown in detail) consists of one fixed delay which is selected or not selected depending on the input thereto from the array. The fine adjust is shown in more detail in FIG. 5, wherein the switching or non-switching of load circuits 74 connected to the delay line 76 are controlled by the load control lines from the array 50, thereby selecting the number of delay increments.

Figure 5:
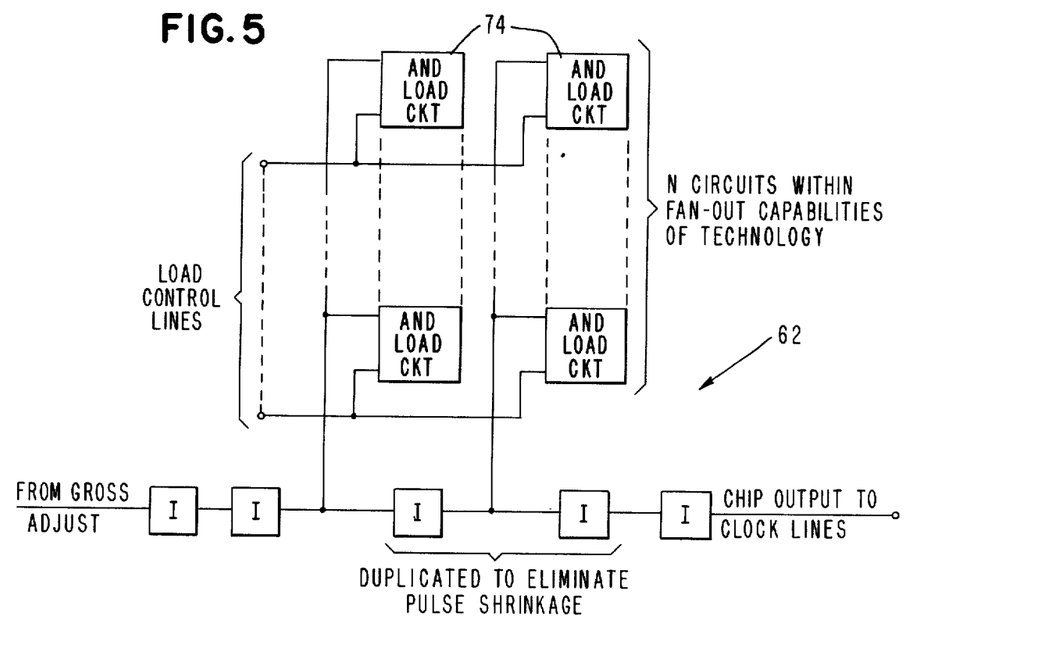
FIG. 5 is a further block diagram showing further details of the fine delay network of FIG. 3.
Figure 6:
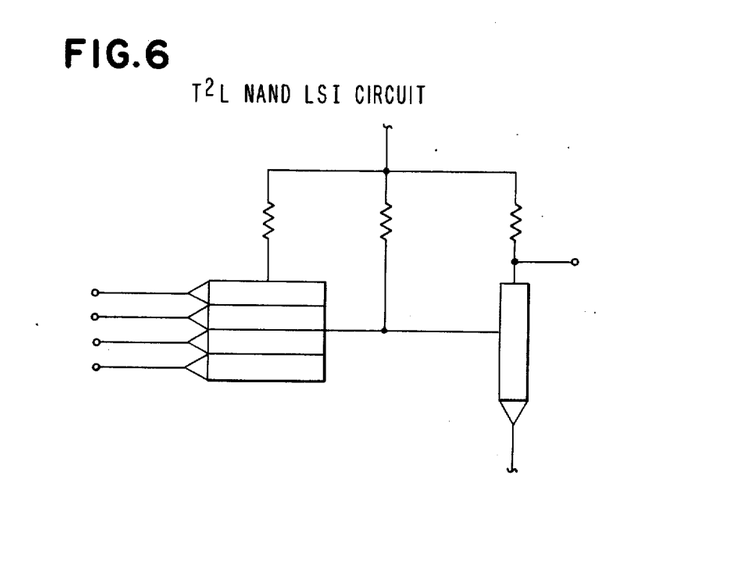
FIG. 6 is a circuit diagram showing the transistor arrangement in T$^2$L NAND logic used in the functional blocks of the system.

FIG. 6 shows a T²L NAND circuit which is an example of the circuitry type that could be used in the various logic boxes shown in FIGS. 4 and 5. Actually, any circuit whose delay is a function of loading could be used.

Figure 7:
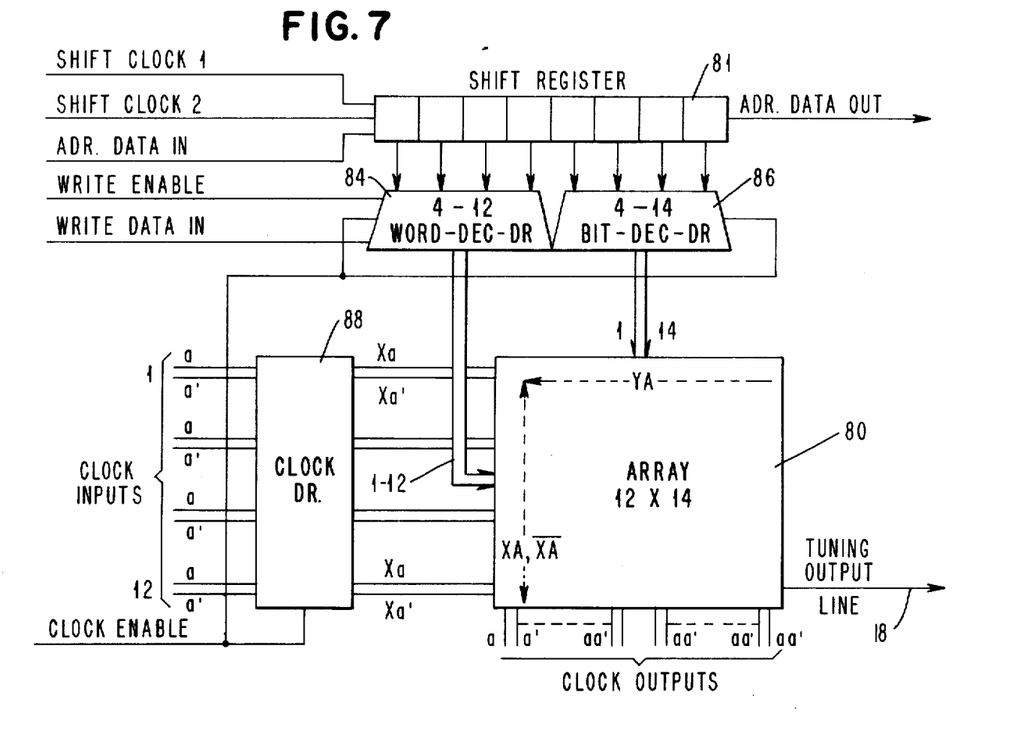
FIG. 7 is a block diagram showing the clock selection chip of FIG. 1.
Figure 8:
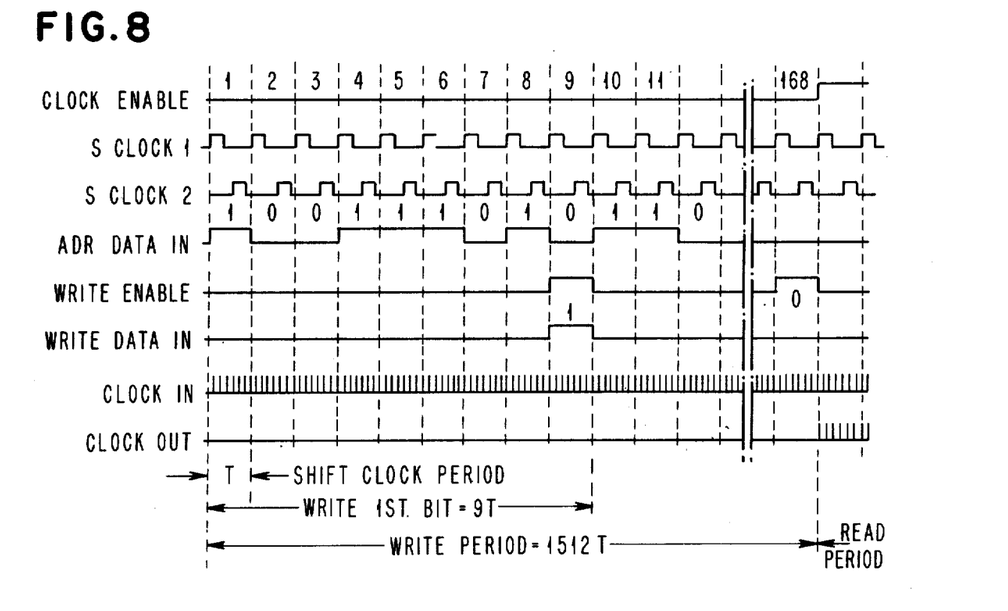
FIG 8 is a schematic representation of the various waveforms associated with FIG. 7.

A schematic diagram of the clock selection chip is shown in FIG. 7. This figure corresponds to FIG. 1 shown in U.S. Pat. No. 3,852,723 which shows and describes a clock distribution system usuable in the present application. The only change with respect to the drawing is the addition of a tuning output line 18 which is connected to the time measuring unit 20 as shown in FIG. 1. This tuning output line 18 is connected in the array so that every clock output from the array can be switched to the tuning output line. The shift register 81 is included in the clock chip shift registers 34, shown in FIG. 2, and the data supplied by the service system 10 is applied to this shift register. The data in the shift register 81 is transferred to memory cells associated with each of the cross point switches in the array 80. The condition of the memory cell determines the operation or non-operation of the cross point switch when the appropriate clocks are applied thereto, thereby distributing the clock inputs to one or more outputs. The arrangement is capable of connecting each one of the input clocks under control of the service system 10 to the tuning output line 18 sequentially.

The memory cells in the array 80 can be written into by the word decoder drive 84, the bit decoder drive 86 and the shift register 81 combination. These input signals applied to the array 80 perform the selection of the addressed memory cell. The input pairs $a$ and $a'$ from the clock programmable delay chip are applied to the clock driver 88 whose output applies the clock pulses in pairs $X_a$, $X_a'$ to the crosspoint switches in the array 80. The crosspoint switches each have a memory cell associated therewith which when it contains a 1 will be in the closed condition so that the positive clock pulse will pass therethrough and provide a pair at the output consisting of a positive clock signal "$a$" and the complement clock signal "$a'$". The operation consists of addressing and writing one memory cell at a time. Therefore, 168 write operations are required to complete the entire distribution pattern. Thus, the clock selection chip is a programmable signal distribution system in which a plurality of input signals are connectable to a plurality of outputs in accordance with a predetermined distribution pattern. The system includes an array of switches connected between each of the inputs and each of the outputs wherein a memory cell is connected to each of the switches. Means are provided for writing a signal into each of the memory cells which is determinative of the condition of the respective switch, and enabling means are provided for enabling the operation of each of the crosspoint switches to provide an output in accordance with the signal stored in the respective memory cell, thereby connecting any one of the inputs to any one or more of the selected plurality of outputs.

The clock tuning and measuring system includes reference generator circuitry 22 on a reference generator card 24 and time detector chip 20. The reference generator circuitry 22 is under control of the service system 20 which sends it the digital delay selection information. Actually the circuitry 22 generates a reference clock signal which is precisely timed with respect to the oscillator frequency in accordance with information provided by the service system.

Figure 9A:
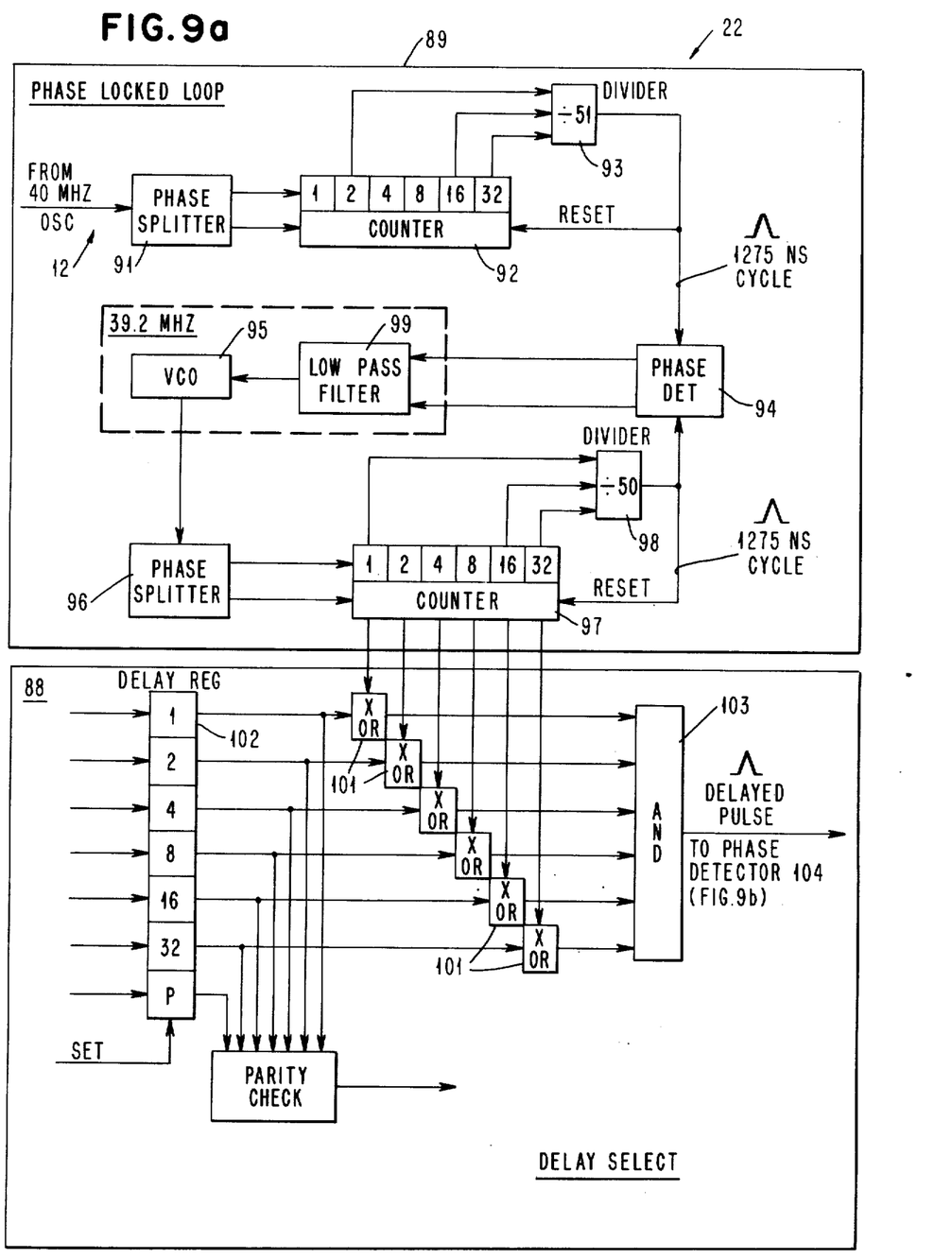
FIGS. 9a and 9b are combined to show a block diagram of the reference generator utilized in the clock tuning and measuring system of FIG. 1.
Figure 9B:
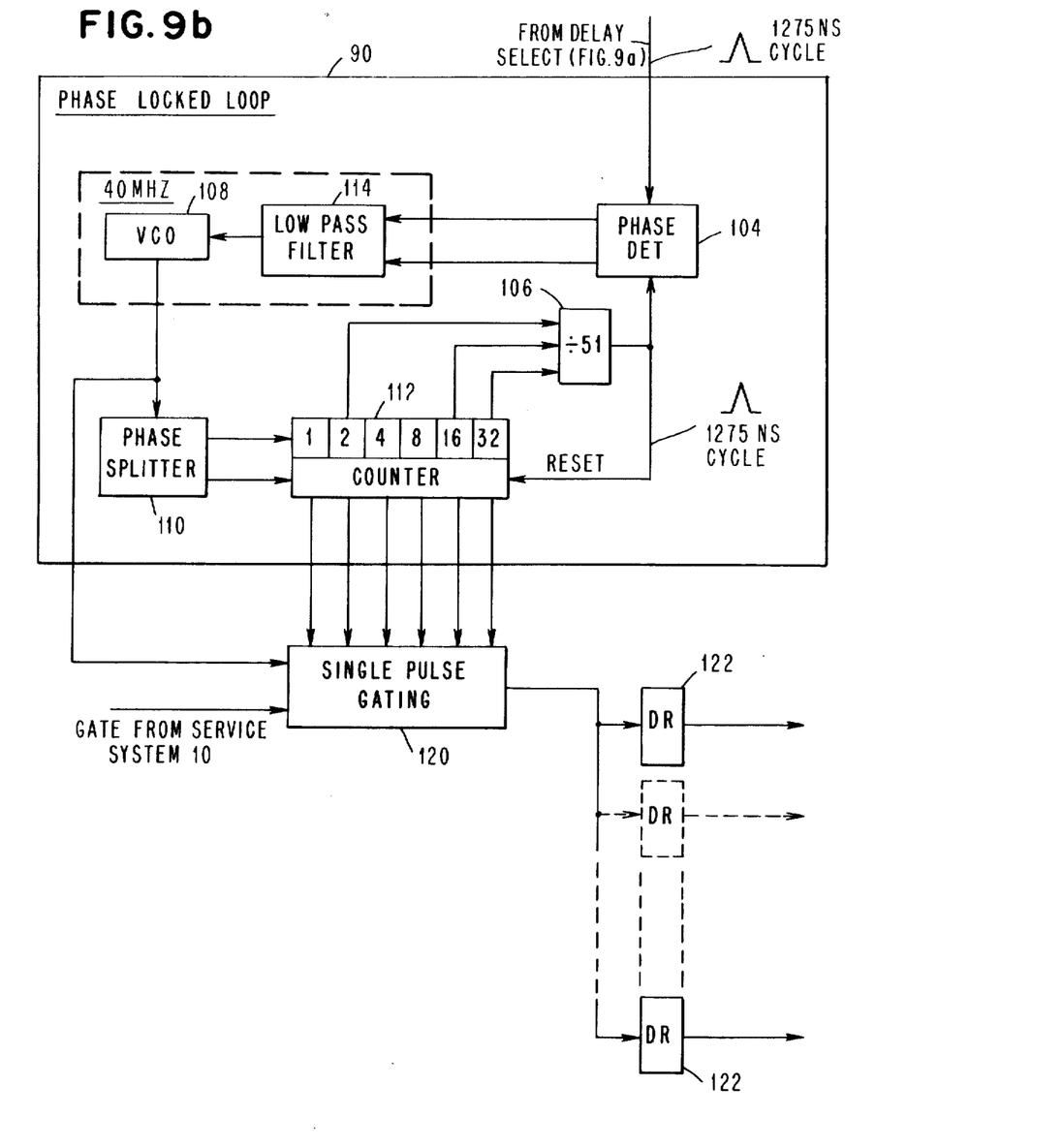

Referring to FIGS. 9a and 9b, there is shown the reference generator circuitry 22 which provides the reference time for the clock pulses by means of which the clocks arriving at the selected nodes on the selected paths can be tuned. For example, the reference times generated are the correct times that the clock pulse should arrive at the preselected nodes. By comparing the clock pulses with the reference time pulses a difference can be obtained by means of which the clock delay can be adjusted. These reference timings are selected by the service system 10. The details of the reference generator circuitry are contained in U.S. patent application Ser. No. 465,029, filed Apr. 29, 1974 which issued as U.S. Pat. No. 3,913,021 on Oct. 14, 1975 having a common assignee with the present invention. This patent application discloses a high resolution digitally programmable electronic delay which is achieved by counting pulses of a stable clock and providing an output signal when a prescribed count is reached. This is in essence provides frequency division or a new larger clock period. A second programmable delay with a different clock period is provided such that a total delay with any combination of the two periods can be programmed. The adaptation of the programmable delay of this co-pending application to the present invention is best shown by using an example to explain the operation thereof. The details of the circuitry utilized are shown in the above referenced patent application. The input to the reference generator circuitry 22 is obtained from the system oscillator and is assumed, for this example, to be 40 MHZ. The reference generator circuitry is broken up into a first phase locked loop 89, a delay select block 88 and a second phase locked loop 90. The phase locked loop 89 establishes the delays in increments of 500 psec. The input 40 MHZ frequency is phase split in phase splitter 91 so as to obtain two opposite phase input signals to operate the counter 92. The counter counts the input cycles of the 40 MHZ source. The count is divided in this case by 51 by divider circuit 93. The output from divider 93 is used to reset the counter and is also utilized as one input to the phase detector 94. The output phase from divider circuit 93 occurs every 1275 nsec. The other input to the phase detector 94 originates at voltage controlled oscillator 95 which has a frequency of 39.2 MHZ which is 0.8 MHZ below the 40 MHZ of oscillator 12. The output is phase split in phase splitter 96 and the two phase outputs are utilized to produce the count in counter 97. When counter 97 reaches a count of 50 the divider circuit 98 produces a pulse output which forms the second input to phase detector 94. Similarly, this pulse has a 1275 nsec. cycle. The phase detector compares the phases of these two input pulses and produces output pulses which go to low pass filter 99. The low pass filter 99 produces a DC voltage which is proportional to the phase difference of the inputs to phase detector 94, thereby adjusting the frequency of the voltage controlled oscillator 95. The loop is ideally locked when the phase detector 94 inuts are in phase, then the phase detector outputs are zero, the low pass filter output is zero and the voltage controlled oscillator is running at it's natural frequency (39.2 MHZ). However, the voltage controlled oscillator frequency will drift, requiring frequency correction. The practical locked condition is obtained when the frequency drift and error correction are minimal and only a slight jitter is observed at the output of the VCO (Voltage Controlled Oscillator). The upper portion of the phase locked loop 89 which generates the first input to the phase detector 94 can be considered as the master portion of the loop and the remaining portion giving rise to the other input to the phase detector can be considered as the slave portion.

Since the input frequency and the VCO frequency differ by 0.8 MHZ or 500 psec. per cycle, the pulses are divided down to the point where both frequencies should always be in phase. This will occur every 1275 nsec. It should be noted that the higher frequency is divided by 51 and the lower frequency is divided by 50. Thus, the purpose of the phase lock loop 89 is to establish the 500 psec. increments of delay.

Figure 9C:
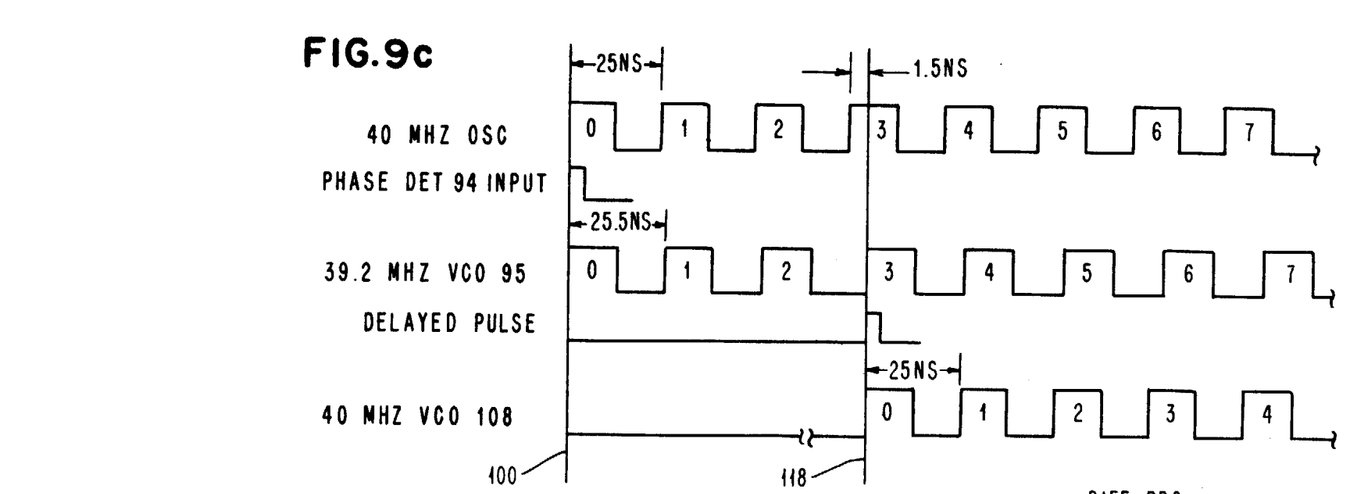
FIG. 9c is a schematic representation of the various waveforms utilized in connection with FIGS. 9a and 9b.

Referring to FIG. 9c, the heavy verticle line 100 indicates the point every 1275 nsec. when both frequencies are in phase. Pulse 1 of the VCO 95 starts 500 psec. later than pulse 1 of the 40 MHZ input oscillator. Pulse 2 of the VCO 95 starts an additional 500 psec. or 1 nsec. later etc. Each VCO 95 pulse is delayed an additional 500 psec. in relation to the corresponding numbered input oscillator pulse. VCO 95 pulse number 50 (or O) will be back in phase again with the input oscillator.

The delay selection is performed by the delay select circuit 88 shown in FIG. 9a where the input to the delay register 102 is obtained from the service system 10. The delay register content is compared with the counter 97 contents by the individual exclusive OR circuits 101. These exclusive OR circuits are arranged to produce an up output when the corresponding registers of delay register 102 and counter 97 are the same. AND circuit 103 produces a pulse when the comparison is made, which pulse goes to phase detector 104 in FIG. 9b. The delayed pulse selected serves as one input to the phase detector 104 in FIG. 9b. This phase locked loop 90 is the same as the phase locked loop 89. The voltage controlled oscillator 108 is set to a frequency of 40 MHZ. These output pulses from VCO 108 pass through phase splitter 110 and are counted by counter 112. The counter 112 is arranged, in conjunction with divide by 51 circuit 106 to produce output pulses whose frequency is divided down by 51 and which serves as the second input to phase detector 104. As can be seen from the phase locked loop 89, this is the same division with respect to the input 40 MHZ and accordingly should produce a 1275 nsec. cycle pulse to the phase detector. The phase comparison is made in phase detector 104 and pulses are sent to low pass filter 114 which produces a DC voltage proportional to the difference in phase between the two phase detector input signals. This DC voltage adjusts the frequency of the voltage controlled oscillator to bring it back to it's 40 MHZ output.

Assume that the delay register 102 in FIG. 9a receives a 3 input from the service system 10. Thus, when counter 97 contains a count 3 the exclusive ORs 101 will all be up and AND circuit 103 will produce an output. It should be noted that the counter 97 is being stepped by VCO 95. Therefore, after a delay of 3 cycles the delayed pulse is connected as the master input of phase detector 104 in FIG. 9b. As previously described this controls the VCO 108. This in essence forces VCO 108 to lock into pulse No. 3 of VCO 95, FIG. 9c. It should be noted that pulse No. 3 is shifted by 1.5 nsec. with respect to the 40 MHZ oscillator 12 number 3 pulse. Therefore, VCO 108 is shifted by 1.5 nsec. The shift of 1.5 nsec. remains constant for each VCO 108 pulse because the 40 MHZ input oscillator 12 and the VCO 108 are running at the same frequency. The 1275 nsec. in phase interval for VCO 108 with respect to VCO 95 is shown at the right heavy vertical line 118. When the data in the delay register 102 is changed, the right heavy vertical line 118 will shift to correspond to the new delay request thus establishing a new delay for the 40 MHZ clock pulses.

The result is that pulses are produced each of which has a 1.5 nsec delay with respect to the clock frequency (40 MHZ). Any one of these delayed pulses can be selected by a gate request from the service system 10. This gate signal switches the single pulse gating circuit 120 to gate the selected pulse from counter 112 to output drivers 122. This pulse is the reference delayed output pulse of the reference generator. Thus, the output pulse has a specific delay that was introduced by the digital delay selection obtained from the service system and represents the delay that the clock arriving at the node being monitored at the output of the clock selection chip should have. When the tuning output signal on line 18 from the clock selection chip 16 is equal to the time delay of the output pulse obtained from the reference generator card, then the output from the time measuring unit 20 to the service system 10 indicates a comparison. However, if the tuning output signal does not have a delay equal to that of the reference generator pulse, then the service system orders an adjustment of the delay of the programmable delay chip 14 so that the clock arriving at the node being monitored is more correctly timed. The correct timing will be indicated by a comparison between the reference generator pulse and the tuning output pulse in the time detector.

Figure 11:
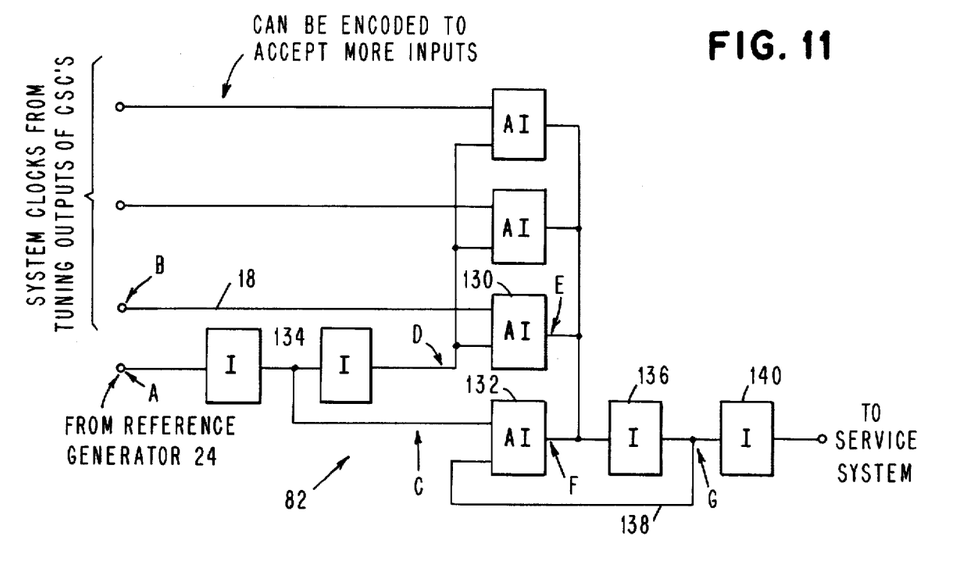
FIG. 11 is a block arrangement showing the latch used in the time detector chip of FIG. 1.
Figure 11A:
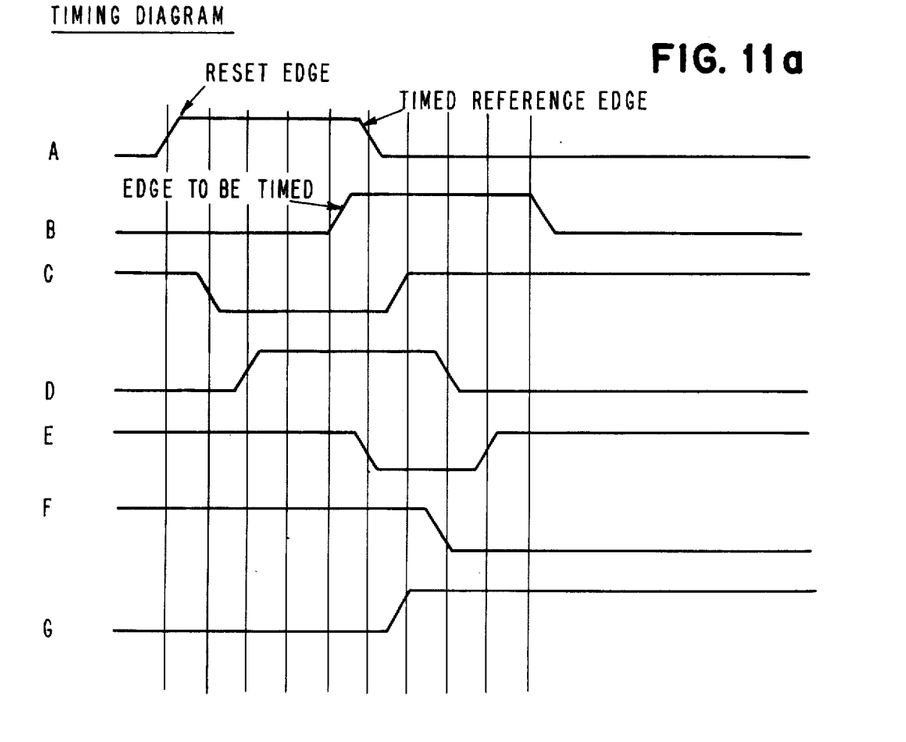
FIG. 11a is a schematic representation of the waveforms generated in the latch of FIG. 11.

The comparison between the reference generator output pulse and the clock pulse on the tuning output line is obtained by a latch circuit 82 on the time detector unit chip 20 as shown in FIGS. 1, 11 and 11a. The latch circuit 82 is used as a detector or measurement unit which produces an output signal to the service system 10 which is related to the timing of the pulse to be tuned with respect to the timing of the pulse from the reference generator. The polarity latch function blocks shown in FIG. 11 can be made up of circuits capable of performing the indicated functions. The NAND circuit shown in FIG. 6 is an example of the type of circuitry that could be used.

In operation, the tuning output 18 from the clock selection chip 16 drives input B of AND invert circuit 130 while the reference generator pulse from reference generator 24 drives output A of invert block 134. The corresponding pulse waveforms at points A through G are shown in FIG. 11a having the corresponding lettering.

The rising transition at point A referred to in timing diagram waveform A as the reset edge, resets the latch. This transistion results in a falling transition at point C following inverter block 134 which effectively disables and invert circuit 132 from controlling the dot of point F and point E. Also, the reset transition produces a rising transition at point D of AI block 130 thereby permitting the clock to be timed on input B of AI block 130 and take control of output E of the block. When the edge to be timed arrives at point B of block 130, the output point E responds. since the point E and point F of the latch are dotted together, and the circuit technology produces a collector dot, whichever output is low (zero) will control the dot. Thus, block 136 responds to the edge to be timed, and as can be seen in waveform G it's output goes up. The output of block 136 drives block 132 via line 138, when the timed reference edge from the reference generator arrives at point C, the AND is satisfied and the output at point F becomes low thereby holding the dot at a low value. When point D responds to the timed reference edge from the reference generator by dropping, it forces the output of block 130 (point E) to go high, output F will continue to maintain the dot low holding the inverse polarity of the input B at the time that the reference edge arrived. Thus, it should be appreciated that if the edge to be timed were delayed with respect to the timed reference edge, there would not be sufficient time to propagate the polarity through blocks 132 and 136, to cause output G to return to the low value it originally held. Thus, the output to the service system 10 from invert block 140 takes on values related to the arrival of the edge to be timed with respect to the timed reference edge.

Figure 10:
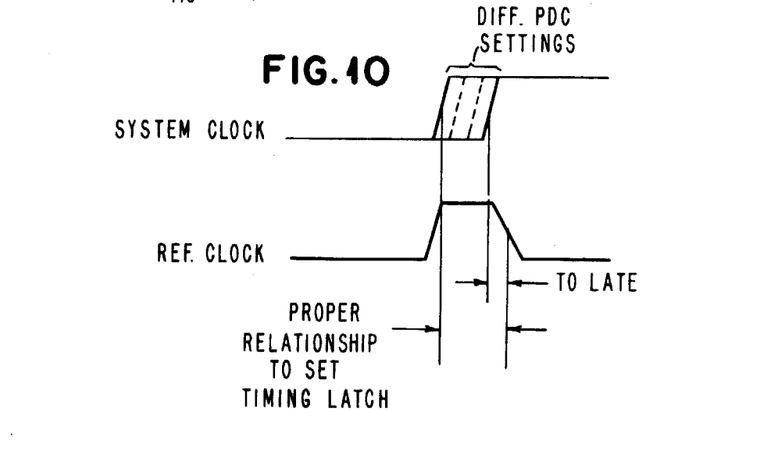
FIG. 10 is a schematic representation of the pulse timing for setting the latch of FIG. 11.

It can be seen from FIG. 10 that the relationship for setting the timing latch 82 requires the system clock from the clock selection chips to be in the proper relationship shown with respect to the reference clock. It can be seen by dotted lines referring to the system clock that the clock can be successively delayed by the increments introduced in the programmable delay chip. Once the leading edge of the system clock occurs in the zone marked too late with respect to the reference clock, the latch will not set. Thus, the latch requires the coincidence of the system clock and the reference clock input to produce a "1" output from the latch. The output from the latch circuit is a DC level which is fed to the service system which in essence interprets the output. A zero output indicates that the service system 10 should select a delay step in the programmable delay chip 14 to introduce another step of delay to the clock pulse so that the next comparison may produce a one output. This continues for the successive zero outputs from the latch until the latch output is a DC level representing a "1" at which time the service system 10 recognizes that the delayed clock is arriving at the node being monitored at the right time. It should also be appreciated that the reference clock could be changed with respect to the system clock until such a comparison was obtained. In other words, the service system 10 would interpret the "0" output to cause a step or increment of delay to be introduced into the reference generator 24. Successive zeroes would institute successive increments until an up voltage representing a "1" was obtained indicating that a comparison of the system clock and reference clock had been obtained. The reference clock delay would indicate the time the system clock is arriving at the node being monitored. The service system 10 is a very flexible tool in that it can be programmed at the whim of the programmer. Thus, larger steps can be programmed rather than going through a sequential step by step process or the arrangement can be programmed for the longest delay, the shortest delay, and any intermediate step in any order.

Figure 12:
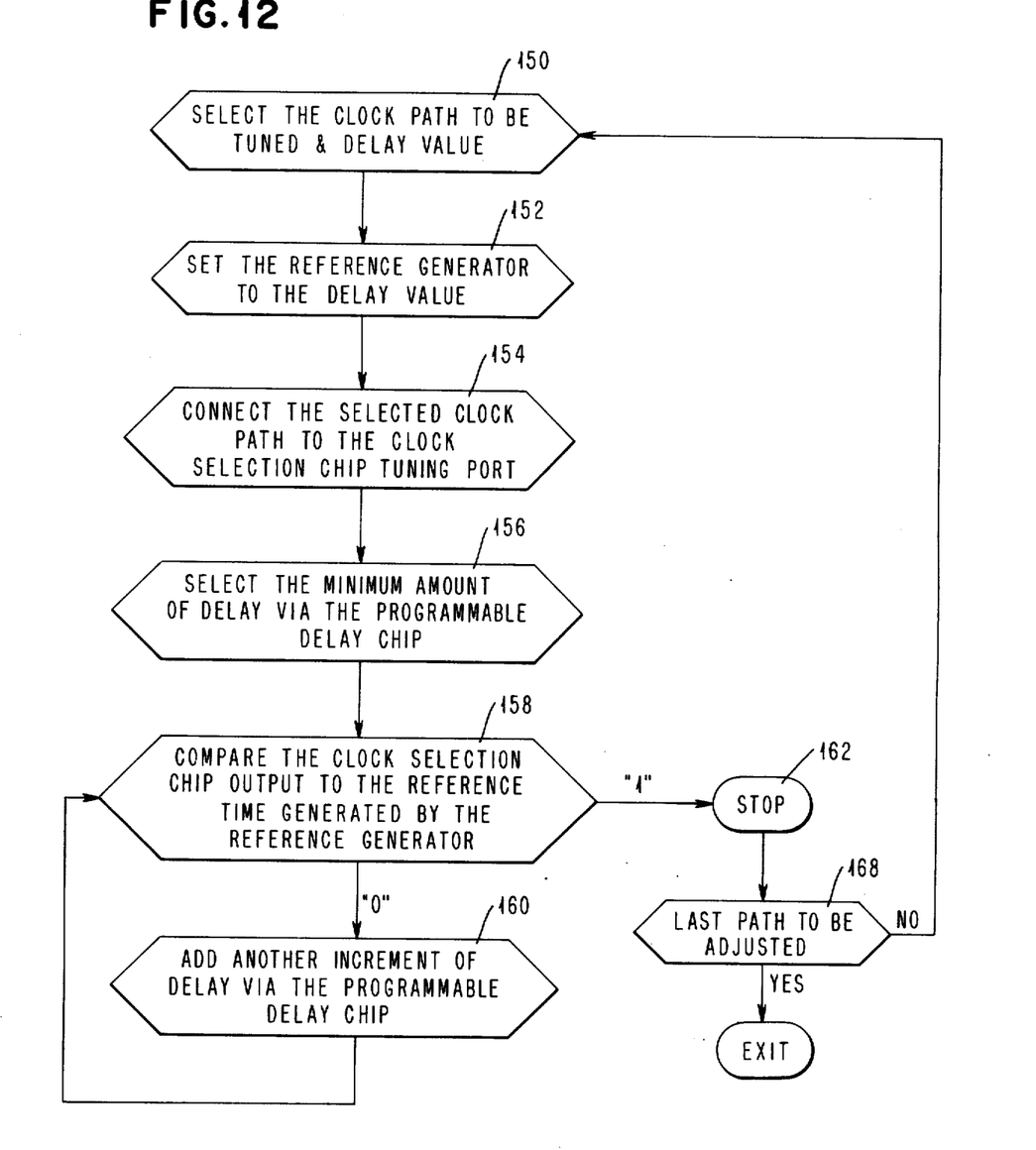
FIG. 12 is a proceddural flow diagram setting forth the programing steps for tuning a clock.

In order to better understand the system, the operation for tuning a clock pulse for a preselected clock path will be explained in accordance with the tuning flow chart shown in FIG. 12. The first function to be performed in the clock tuning system is represented by block 150 which calls for the selection of the clock path to be tuned and the corresponding delay value. It will be recalled from our previous description that the clock path selection is accomplished by providing the correct control data to the shift register 81 in the clock selection chip. This data is obtained from the storage or memory 32 associated with the service system under control of the program. The program will address the right positions in the storage and cause the information therein to be fetched and transferred to the clock selection chip control register. Once the path to be tuned has been selected, the reference generator 22 is set to the proper value as indicated by block 152. This is accomplished by obtaining the delay data from storage associated with the selected clock path. This delay information is transmitted to delay register 102 in the delay select portion 88 of the reference generator. The reference delay is generated in the reference generator in accordance with the information in the register and is represented in the form of a pulse having the called for reference delay.

The next step in the procedure is indicated by block 154 and consists of connecting the clock path, which is selected, to the tuning output line 18. This is accomplished, as was previously described, by connecting each of the clock outputs from the cross-point array to the tuning output line 18. The next step, as seen from block 156, is to set the delay of the delay chip 14 to some initial value. In the case defined in FIG. 12, the delay is set to the minimum delay.

The minimum delay was selected for the example since this arrangement is the easiest to actually program. This arrangement at times requires more steps than others, for example, a long set-up time can be avoided by starting at mid-delay range and making the necessary delay adjustments to the clock pulse in the appropriate direction therefrom. The comparison of the clock selection chip output with the reference time generator, which takes place in the time detector unit as represented by block 158 in FIG. 12, is representative of the function performed by the time detector unit latch, FIG. 11. The latch provides a latching or no-latching as represented by a one or zero output depending on whether the actual clock to be tuned or the edge to be timed corresponds in time to the timed reference edge as seen on the timing diagram, FIG. 11a. When there is a "0" output from the detector meaning that the actual clock is earlier than the reference, then a further delay is added to the actual clock via the programmable delay chip 14 as represented by block 160 in FIG. 12. The comparison between the actual clock and the reference is made again to determine whether the actual clock is in time comparison with the reference edge or not. Again, if there is no comparison a "0" output is obtained. However, if there is a comparison of the actual clock and the reference, a "1" output is obtained from block 158 which results in the stopping (block 162) of that particular tuning sequence for the clock on the selected path. The program then continues if there is a further path to be adjusted (block 168) by starting the procedure again with the selection of the new clock path to be tuned (block 150). As previously mentioned, in order to measure the clock arrival time at a particular node, the service system can interpret the output of the latch and accordingly increment or decrement the reference generator 24 until a latch state change is obtained. This indicates that the reference generator delay is equivalent to the system clock delay thereby providing a measure of the delay of the clock on the distribution path being monitored. Once a clock is tuned, the service system 10 selects another gate path through the programmable selection chip 16, on which a clock can be tuned following the procedure above.

While the invention has been particularly shown and described with reference to the embodiment thereof, it will be understood by those skilled in the art that the foregoing and other changes in form and detail may be made therein without departing from the spirit and scope of the invention.

What is claimed is:

1. An automatic clock tuning system including computing means of the type having a preloaded data memory providing control data to said tuning system for use in a data processing system of the type in which sequential fixed frequency clock pulses from a clock pulse source are utilized to time logic circuit operations comprising;

a delay means for providing fixed frequency clock pulses in the data processing system with the delay determined by said control data from the data memory;

a clock distribution means for distributing the delayed clock pulses received from said delay means in accordance with the clock path selection information contained in the control data obtained from the data memory;

a reference generator connected to said source of fixed frequency clock pulses for introducing predetermined increments of delay to successive clock pulses and for selecting under control of said control data from said memory the one of said clock pulses having a delay substantially equivalent to the predetermined timing associated with the path to which said clock distribution means is set;

an automatic time detecting means connected to said reference generator and to said clock distribution means for providing an output indicative of a comparison or non-comparison of the time of occurrence between one of the delayed clock pulses from said clock distribution means and said selected reference delayed clock pulse from said reference generator, the non-comparison condition output effecting an adjustment of the delay of said delay means through said computing means, said time detection repeating until a comparison of one of the delayed clock pulses and said reference delayed clock pulse is obtained thereby indicating that the clock pulses have the predetermined timing for the selected distribution path.

2. An automatic clock tuning system according to claim 1, wherein said delay means includes a plurality of delays selectably connectable into said clock path and a delay selection means for selecting one or more of said plurality of delays for connection into said clock path.

3. An automatic clock tuning system according to claim 2, wherein said delay selection means includes a shift register for receiving the delay control data from said computing means and for providing the control data for selecting the corresponding delays of said plurality of delay means.

4. An automatic clock tuning system according to claim 2, wherein said delay selection means includes a memory array for holding a bit pattern determinitive of the selection of said delay means.

5. An automatic clock tuning system according to claim 4, wherein said memory array includes an array of polarity hold latches to hold the bit pattern until the delay selection is exercised.

6. An automatic clock tuning system according to claim 2, wherein said plurality of delays include at least a gross and fine delay where said gross delay consists of a number of fixed delays and said fine delay is determined by the number of switch selectable gates connected to the clock path to be tuned, each gate switched adding an equal increment of delay.

7. An automatic clock tuning system according to claim 1, wherein said clock distribution means includes a programmable switching means for connecting one or more clock inputs to any one or more clock outputs, each of said clock inputs being connected to a tuning output connected to said automatic time detecting means.

8. An automatic clock tuning system according to claim 7, wherein said clock distribution means further includes a shift register for receiving both the switching data and programmable switching means addresses from said computing means for controlling the switching of the input clock from said programmable delay means to the selected paths.

9. An automatic clock tuning system according to claim 1, wherein said reference generator includes means for generating a first invariant clock frequency from said system oscillator frequency, means for generating a second variable clock frequency different from said first frequency, the frequency selections establishing the increment of phase differences between the clock pulses of said first and second frequencies, means for selecting the clock out of said second frequency having the desired number of increments of phase difference, means for generating a third frequency equal to said first frequency wherein the selected clock out of said second frequency is utilized to establish the selected increment of phase difference of all the clocks of said third frequency with respect to said first frequency, and means for gating a single one of said clock pulses from said third frequency having the selected delay as an output.

10. An automatic clock tuning system according to claim 7, wherein said automatic time detecting means includes a latch circuit which has as one input thereto the tuning output pulse from the clock distribution means and as the other input thereto to the gated reference delayed clock pulse from said reference generator, the latch output is connected to said computing means which controls the delay selection in the programmable delay means, the operation of the latch indicating a comparison of the delayed clock in the selected path with the reference clock from the reference generator.

11. An automatic clock tuning system according to claim 1, wherein said time detecting means provides an output to said computing means in response to a noncomparison of the delayed clocking pulse from said clock distribution means and the reference signal from said reference generator, said computing means changing the reference delay selected in said reference generator until a comparison between said delayed clock pulse and said reference signal is obtained thereby measuring the timing of said delayed clock pulse.

12. An automatic clock tuning system according to claim 1, wherein the inputs to said computer means from said time detector means and the output control data from said computer means are in digital form so that the control information represented thereby can be accurately transmitted over long distances thereby allowing the computer means to be located at a remote location from the rest of the data processing system being tuned.

13. An automatic clock tuning system according to claim 1, wherein a plurality of said programmable delay means, a plurality of said clock distribution means and a plurality of said time detector units are provided interconnected with said reference generator and said computing means for providing simultaneous clock tuning of a plurality of data processing systems.

* * * * *